Patented Oct. 1, 1940

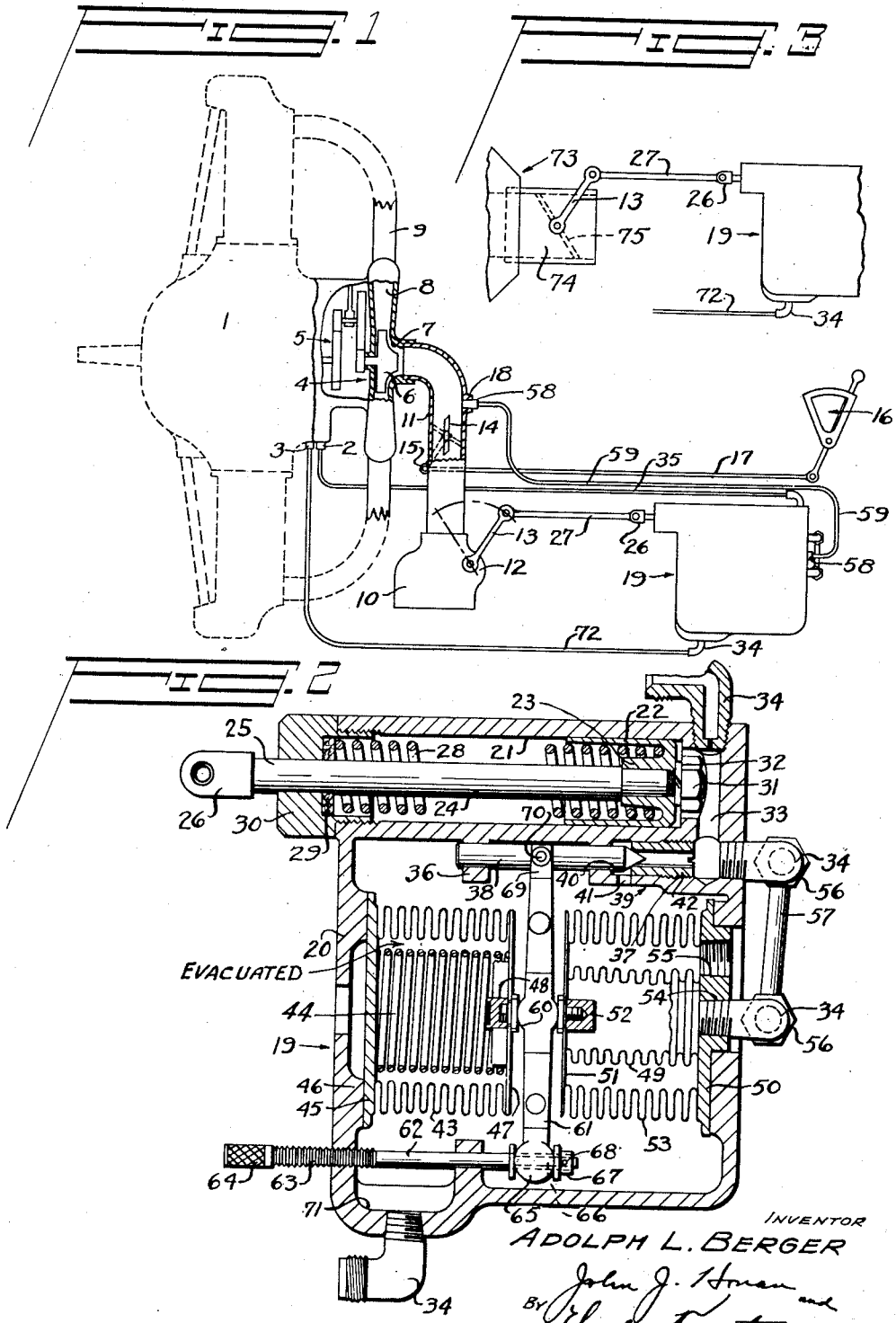

2,216,699

UNITED STATES PATENT OFFICE 2,216,699

AUTOMATIC REGULATOR

Adolph L. Berger, Dayton, Ohio

Application December 3, 1937, Serial No. 177,936

5 Claims. (Cl. 121—41)

(Granted under the act of March 3, 1883, as amended April 30, 1928; 370 O. G. 757)

The invention described herein may be manufactured and used by or for the Government for governmental purposes, without the payment to me of any royalty thereon.

In the operation of internal combustion engines subjected to varying pressures, such as those encountered during ascent and descent of aircraft, or where any paralleling pressure variation is encountered, it becomes necessary to provide a means for automatically varying carburetor air-fuel ratio or supercharger pressure-altitude ratio in order that satisfactory and economical engine operation may be obtained.

It is the purpose of my invention to furnish an automatic control for varying carburetor air-fuel ratios or supercharger pressure-altitude ratios. I propose to do this, on the one hand, by providing a means for use in connection with any carburetor, fuel meter, or injection device which will assure proper fuel introduction into the aircraft engine irrespective of pressure or altitude changes, or on the other hand, by providing a means for use in connection with a valve controlling any supercharger intake or equivalent for maintaining constant combustion pressures within the cylinders of an aircraft engine irrespective of changes in the surrounding atmospheric pressure with changes in altitude.

With the foregoing and other objectives in view, which will appear as the description proceeds, the invention consists of certain new and novel improvements in automatic mixture control regulators, which will be hereinafter more fully illustrated in the accompanying drawings and more particularly pointed out in the appended claims.

Referring to the drawing, in which numerals of like character designate similar parts throughout the several claims:

Fig. 1 is a side elevation of my invention applied to a carburetor mixture control;

Fig. 2 is a cross-sectional view of the automatic regulator; and

Fig. 3 is a partial side elevation of the automatic regulator of Fig. 2, applied to a supercharger pressure control.

In Fig. 1, I have shown in dotted outline the side profile of a typical radial aircraft engine 1. The engine 1 is provided with conventional oil pump having a pressure outlet 2 and a return inlet 3. The aft end of the engine is shown in partial broken-away cross section to indicate the internal workings of a centrifugal compressor 4. The compressor 4 is crankshaft driven by means of conventional gearing 5 which terminates in an impeller 6. The impeller 6 is contained within an impeller chamber 7, in operable connection with a scroll 8 leading directly into conduits 9 discharging into the cylinder intakes of the engine 1. The engine 1 is also provided with a carburetor 10 operably connected to the inlet mouth of the compressor 4 by means of inlet conduit 11. The carburetor 10 is provided with a conventional mixture control 12 for effecting air-fuel ratio variation through appropriate movement of operating lever 13. The air inlet 11 is provided with a conventional butterfly valve 14 having the usual operating lever 15. The operating lever 15 is controlled by means of an engine throttle control 16 and connecting rod 17. The inlet conduit 11 is further provided with a pipe fitting boss 18.

In previous operation of aircraft, it has been customary to furnish a manual control similar to the engine throttle control 16 for actuating the operating lever of the mixture control 12. As the aircraft gained altitude and the pressure of the atmosphere surrounding the engine decreased, the mixture control was progressively manually adjusted to effect the air-fuel ratio initially maintained at ground level. I propose to substitute for the aforesaid manual control, an automatic mixture control regulator 19, more fully described hereinbelow.

In Figs. 1 and 2, the automatic mixture control regulator 19 is provided with a housing 20 having a cylinder 21 extending laterally across its top portion. The cylinder 21 is provided with a piston 22 having a hub 23 to which is threaded a rod 24. An outer end 25 of the rod 24 has a forked fitting 26 mounted thereon. The fitting 26 is directly connected to the operating lever 13 by means of a connecting rod 27.

The piston 22 is adapted to be urged in one direction by a coiled spring 28, engaging therewith at one end and seated at its opposite end against a washer 29. The washer 29 is retained within the cupped inner extremity of an abutment plug 30. The rod 24 is threaded at its inner extremity to permit fixing of the piston 22 by means of a nut 31 and lock washer 32. The right-hand extremity of the cylinder 21 is provided with a vertical passage 33 provided at its upper extremity with a conventional pipe tap for receiving pipe L 34 which, in Fig. 1, is shown to be operably connected with the pressure outlet 2 by means of piping 35.

The bottom wall of the cylinder 21 is provided with boss projections 36 and 37, which perform the joint function of acting as a sliding journal for a needle valve 38, and providing a bleeder 39. The bleeder 39 consists of a cavity 40, cavity outlet 41, and threaded valve seat sleeve 42. The non-valve extremity of the sleeve 42 is in operable communication with the passage 33. Thus, the heads of the piston 22 and the valve 38 are, during operation of the aircraft engine, at all times subjected to a varying oil pressure.

The lower central portion of the housing 20 is provided with three co-axially aligned diaphragm elements. An atmospheric pressure responsive means in the form of a completely evacuated diaphragm 43 is prevented from initial collapse by means of a retaining spring coil 44. The left extremity of the diaphragm 43 terminates in a base 45 resting against a boss 46 provided on the inner surface of the housing 20. The right extremity of the diaphragm 43 is sealed with a diaphragm plate 47 having central bearing surface 48. Oppositely disposed to the diaphragm 43 is provided a double diaphragm with coaxially disposed inner (49) and outer (53) elements completely sealed against intercommunication with one another. The inner diaphragm 49, which I propose to utilize as a servo motor, is fixed at its right extremity to a base 50, the left extremity thereof being similarly fixed to a plate 51 provided with a bearing surface 52. The outer diaphragm 53, which I propose to utilize as a variable fluid pressure responsive means, is also fixed at its outer extremities to the base 50 and the plate 51. The common base 50 is provided with pipe taps 54 and 55 in direct communication, respectively, with inner diaphragm 49 and outer diaphragm 53. It will be seen that the passage 33 of housing 20 is at all times in operable communication with the interior of the inner diaphragm 49 by means of conventional pipe L's 34, pipe fittings 56, and a piping 57. On the other hand, the interior of the variable fluid pressure responsive means constituting the outer diaphragm 53 is at all times in operable communication with the interior of the inlet mouth of the compressor 4 by means of pipe fittings 58 and a piping 59.

The oppositely disposed surfaces of the bearing surface 48 and bearing surface 52 are at all times fixedly spaced apart by means of an enlarged central portion 60 of a floating lever 61, the lower end of which has sliding connection with a rod 62, the setting of the rod 62 being adjustable by means of a threaded portion 63 and knurled handle 64, the lower extremity of the floating lever 61 being provided with an enlarged central portion 65 similar in exterior characteristics to portion 60. The interior of portion 65 is hollowed out to permit limited tilting of the floating lever 61 about a necked-down portion 66 of the rod 62 which is made fast thereto by means of a collar 67 and a pin 68. The upper extremity of the floating lever 61 is provided with a yoke 69 pivoted to the needle valve 38 by means of a pin 70. A sump 71 is provided at the lower left extremity of the housing 20 for the collection of oil by-passed by the bleeder valve 39. The sump 71 is interconnected to the return inlet 3 of the engine 1 by means of pipe fitting 34 and piping 72.

When my mixture control regulator 19 has been properly adjusted, the diaphragm 43 and inner and outer diaphragms 49 and 53 are in equilibrium, and the bleeder 39 is open to bypass any oil entering the passage 33 through the hollow central portion of the sleeve 42 and cavity outlet 41 provided in boss projection 37. However, as soon as there is a decrease in pressure in outer diaphragm 53 due to throttle operation, the bleeder 39 closes, raising the oil pressure in inner diaphragm 49 and on piston 22 until equilibrium has again been established between diaphragm 43 and inner and outer diaphragms 49 and 53, and the higher pressure moves piston 22 to a new position which in turn moves the mixture control 12 to its proper position in relation to engine manifold pressure. For normal sea level operation, the travel of piston 22 is dependent upon the decrease in pressure in outer diaphragm 53; that is, when a very low pressure is present as during idling operation the oil pressure will be raised to an amount equal to the difference in pressure between inner and outer diaphragms 49 and 53 resulting in a rather extended piston travel while in the case of part throttle operation the movement of piston 22 will be somewhat less, the amount of travel being in direct relation to pressure difference between diaphragms 49 and 53 and any pressure exerted by diaphragm 43. In the case of altitude operation, the diaphragm 43 expands, resulting in operation substantially the same as heretofore described. However, the amount of piston travel will be increased and in direct relation to the decreased pressure in outer diaphragm 53 and the amount of pressure exerted by the expansion of diaphragm 43.

In Fig. 3, I have shown the pressure control of a turbine supercharger 73; comprising a sleeve 74, a conventional butterfly valve 75, and the operating lever 13 shown in Fig. 1. Interconnection and operation of the lever 13 is identical in character to operation of similar lever appearing in Fig. 1.

I claim:

1. In a power regulator, a fluid pressure actuated part, means including a lever for controlling the fluid pressure to said part, an expansible device contacting said lever for moving the same, a second expansible device contacting said lever for moving the same, said first-mentioned expansible device being sealed under vacuum and having its exterior exposed to atmospheric pressure, and said second-mentioned expansible device being connected with a source of fluid pressure, and a third expansible device operatively connected with said lever for moving the same in opposition to said first-mentioned expansible device and with a force directly proportional to the power applied to said part to be actuated.

2. In a power regulator, a fluid pressure actuated part, means including a lever for controlling the fluid pressure to said part, an expansible device contacting said lever for moving the same, a second expansible device contacting said lever for moving the same, said first-mentioned expansible device being sealed under vacuum and having its exterior exposed to atmospheric pressure, and said second-mentioned expansible device being connected with a source of fluid pressure, and a third expansible device operatively connected with said lever for varying the combined effects of said part and second expansible device in accordance with and proportional to the force applied to said part to be actuated.

3. In a power regulator, a fluid pressure actuated part, means including a lever for controlling the fluid pressure to said part, an expansible device contacting said lever for moving the same, a second expansible device contacting said lever for moving the same, said first-mentioned expansible device being sealed under vacuum and having its exterior exposed to atmospheric pressure, and said second-mentioned expansible device being connected with a source of fluid pressure, a third expansible device operatively connected with said lever for varying the combined effects of said part and second expansible device in accordance with and proportional to the force applied to said part to be actuated, and manual means for adjusting the initial position of said lever.

4. In a power regulator for an internal combustion engine, a fluid pressure actuated part, means for continuously supplying fluid under pressure to a chamber communicating with said part, a relief valve in said chamber, an expansible device responsive to atmospheric pressure and operative to increase a force on said valve tending to close the same upon decreasing pressure, an expansible device responsive to manifold pressure in said engine and operative to increase a force on said valve tending to open the same upon increasing pressure, and an expansible device responsive to the fluid pressure in said chamber to apply an equilibrating force on said valve in a direction tending to open the same.

5. In a power regulator, a fluid pressure actuated part, a movable member for controlling the fluid pressure to said part, an expansible device for moving said member, a second expansible device for moving said member, said first-mentioned expansible device being sealed under vacuum and having its exterior exposed to atmospheric pressure, said second-mentioned expansible device being connected with a source of fluid pressure, and a third expansible device operatively connected with said member for varying the combined effects of said first and second expansible devices in accordance with and proportional to the force applied to said part to be actuated.

ADOLPH L. BERGER.